United States Patent [19]

Hsu

[11] Patent Number: 5,337,609

[45] Date of Patent: Aug. 16, 1994

[54] HANDLEBAR STRUCTURE FOR A COLLAPSIBLE BICYCLE

[76] Inventor: Su-Yuan Hsu, Ra. A. 3rd Fl., No. 112, Chung Shan N. Road, Taipei, Taiwan

[21] Appl. No.: 72,045

[22] Filed: Jun. 7, 1993

[51] Int. Cl.⁵ ............................................. B62K 21/16
[52] U.S. Cl. ................................... 74/551.3; 74/551.1; 74/551.4; 280/278; 280/287; 403/131
[58] Field of Search ..................... 74/551.1–551.8; 403/191; 280/279, 278, 287, 280

[56] References Cited

U.S. PATENT DOCUMENTS

| | | | |
|---|---|---|---|
| 3,260,535 | 7/1966 | Jaulmes | 280/279 |
| 4,321,370 | 5/1990 | Handler et al. | 403/191 |
| 4,462,606 | 7/1984 | Hon | 280/278 |
| 4,611,818 | 9/1986 | Cammarata | 74/551.4 |
| 4,767,130 | 8/1988 | Chao | 280/287 X |
| 5,052,706 | 10/1991 | Tsai et al. | 280/278 X |
| 5,133,224 | 7/1992 | Prins | 74/551.3 |

FOREIGN PATENT DOCUMENTS

| | | | |
|---|---|---|---|
| 4224374 | 1/1993 | Fed. Rep. of Germany | 74/551.8 |
| 1482367 | 5/1967 | France | 280/287 |
| 0172979 | 3/1986 | PCT Int'l Appl. | 74/551.1 |
| 203007 | 2/1939 | Switzerland | 74/551.3 |
| 1556994 | 4/1990 | U.S.S.R. | 280/280 |
| 1112828 | 5/1968 | United Kingdom | 280/287 |

*Primary Examiner*—Vinh T. Luong
*Attorney, Agent, or Firm*—Bacon & Thomas

[57] ABSTRACT

An improved handlebar structure for a collapsible bicycle mainly uses a locking mechanism to clamp and lock the upper tube and the lower tube of the bicycle together. The locking mechanism comprises a bolt, a pressing lever and a U-shaped clamping member. The bolt feeds through the pivotal connection of the upper tube and the lower tube, with its front end being secured to the U-shaped clamping member and its rear end being coupled to the pressing lever.

2 Claims, 4 Drawing Sheets

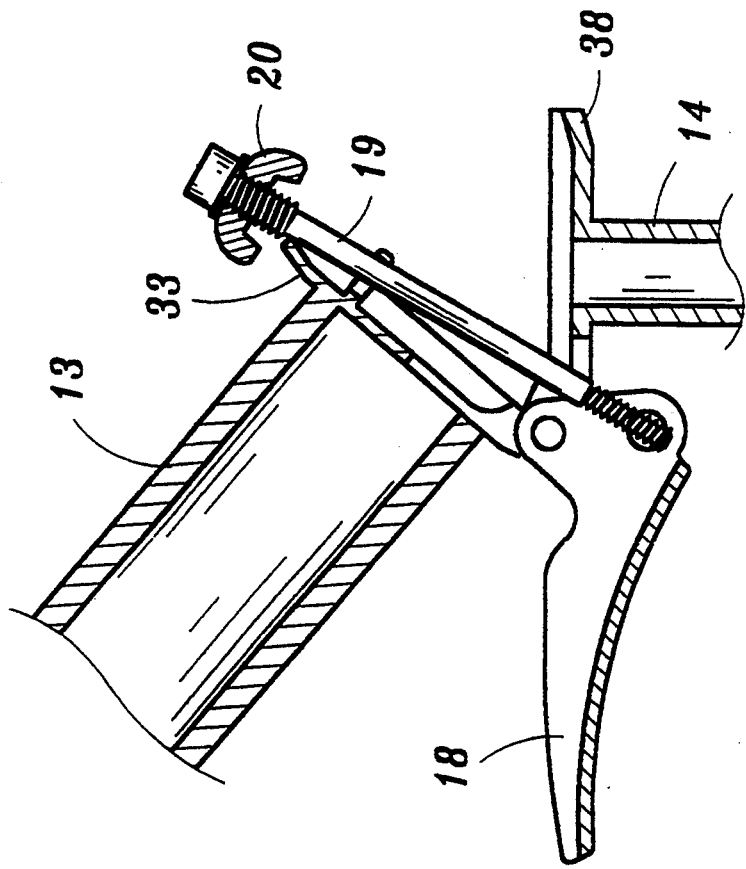
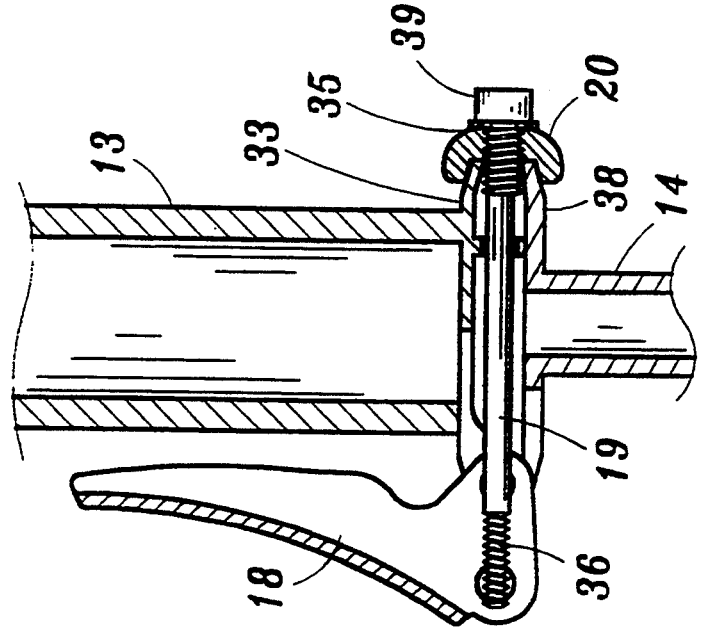

HANDLEBAR STRUCTURE FOR A COLLAPSIBLE BICYCLE

BACKGROUND OF THE INVENTION (a) Field of the Invention

The present invention relates to a handlebar structure for a collapsible bicycle. More specifically, the present invention relates to a collapsible handlebar structure which uses a pressing lever to engage the clamping of the handle bar so that it can be mounted and dismounted easily.

(b) Description of the Prior Art

The conventional structure of the handlebar for the collapsible bicycle uses a "U" shaped clamping member to clamp the flanges of the upper tube and the lower tube together. The upper tube is part of the handlebar assembly while the lower tube is part of the front fork assembly. The collapsible handlebar of the prior art uses a bolt, which can be turned by hand, to tighten the "U" shaped clamping member. The tightening of the bolt keeps the upper tube and the lower tube in a secured upright position. In order to dismount the collapsible handlebar of the bicycle, the user turns the bolt counter clockwise so that the "U" shaped clamping member can be loosened up and the upper tube and the lower tube can be disconnected or dismounted. Obviously, the user cannot operate the locking of the handlebar quickly and efficiently. For the collapsible bicycle, the inconvenience of assembling the handlebar causes a burden for the user.

In order to overcome the above drawback, the existing design of the handlebar uses a structure having a cam and a bolt to make the operation easier. But such structure with the cam and the bolt is complicated and is difficult to manufacture. This increases cost and is not economical. On the other hand, the improved handlebar structure according to the present invention is simple in structure, easy to put up and take down for operation, and the manufacturing cost is lowered.

SUMMARY OF THE INVENTION

The main object according to the present invention is to provide an improved structure for the handlebar of a collapsible bicycle. Such handlebar structure has a locking mechanism which is easy to operate. It uses a pressing lever to push a bolt and a U-shaped clamping member to maintain the handlebar of the bicycle in a locked position.

Another object according to the present invention is to provide a collapsed structure for a bicycle handlebar which is of simple construction and economical manufacture.

BRIEF DESCRIPTION OF THE DRAWINGS

The drawings disclose an illustrative embodiment of the present invention which serves to exemplify the various advantages and objects hereof, and are as follows:

FIG. 3 is a cross-sectional elevational view, taken along the line 3—3 of FIG. 1 showing the upper tube and the lower tube of the handlebar assembly mounted together vertically according to the present invention;

FIG. 4 a cross-sectional plan view showing the upper tube separated from the lower tube and the handlebar assembly is in a removed position.

DETAILED DESCRIPTION OF THE PREFERRED EMBODIMENT

Figure 1:
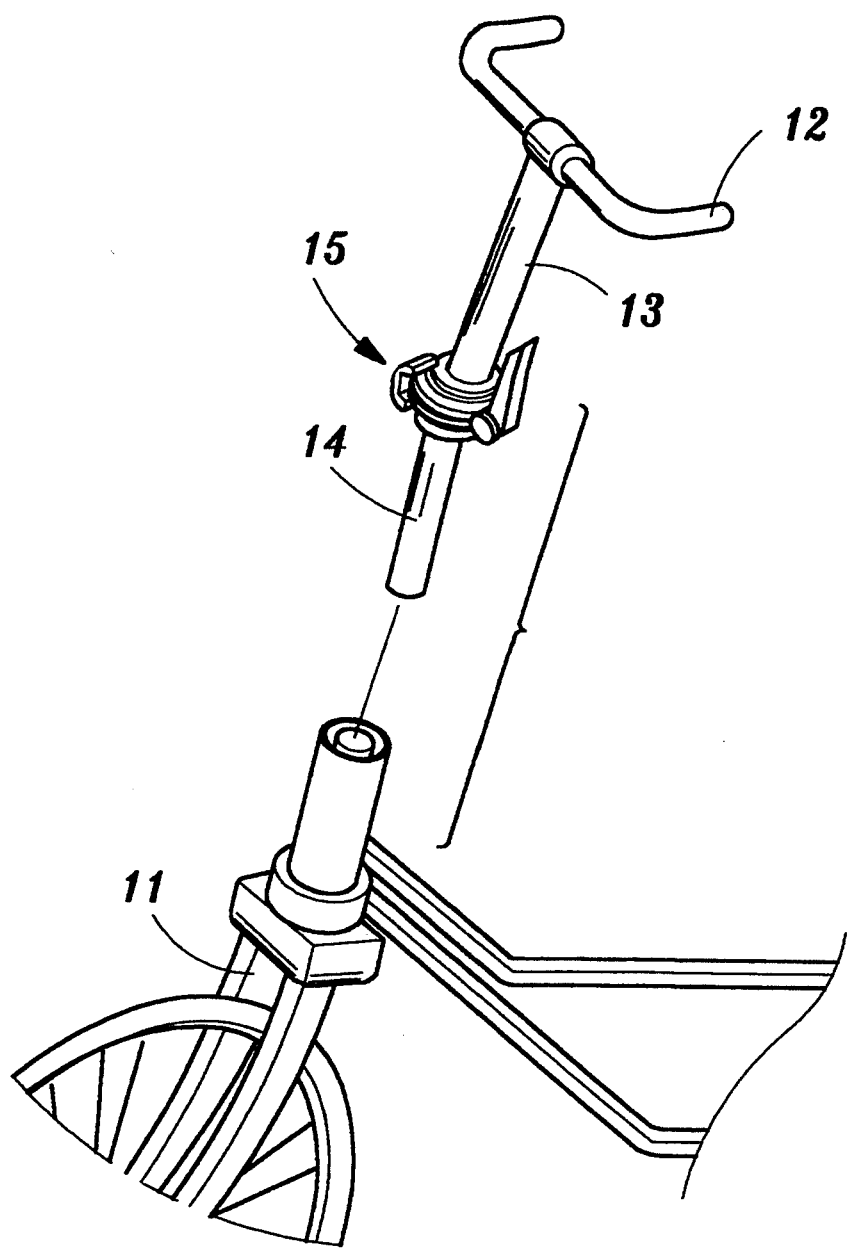
FIG. 1 is a perspective view showing the manner in which the handlebar is installed in a collapsible bicycle according to the present invention.

Referring to FIG. 1, the improved structure of a handlebar 12 for a collapsible bicycle according to the present invention consists of a lower tube 14 forming part of the front fork of the bicycle, an upper tube 13 which is connected to the handlebar 12 at its top and is collapsible with the lower tube 14 at its bottom, and a locking mechanism 15 which is used to clamp and lock the upper tube 13 and the lower tube 14 together.

Figure 2:
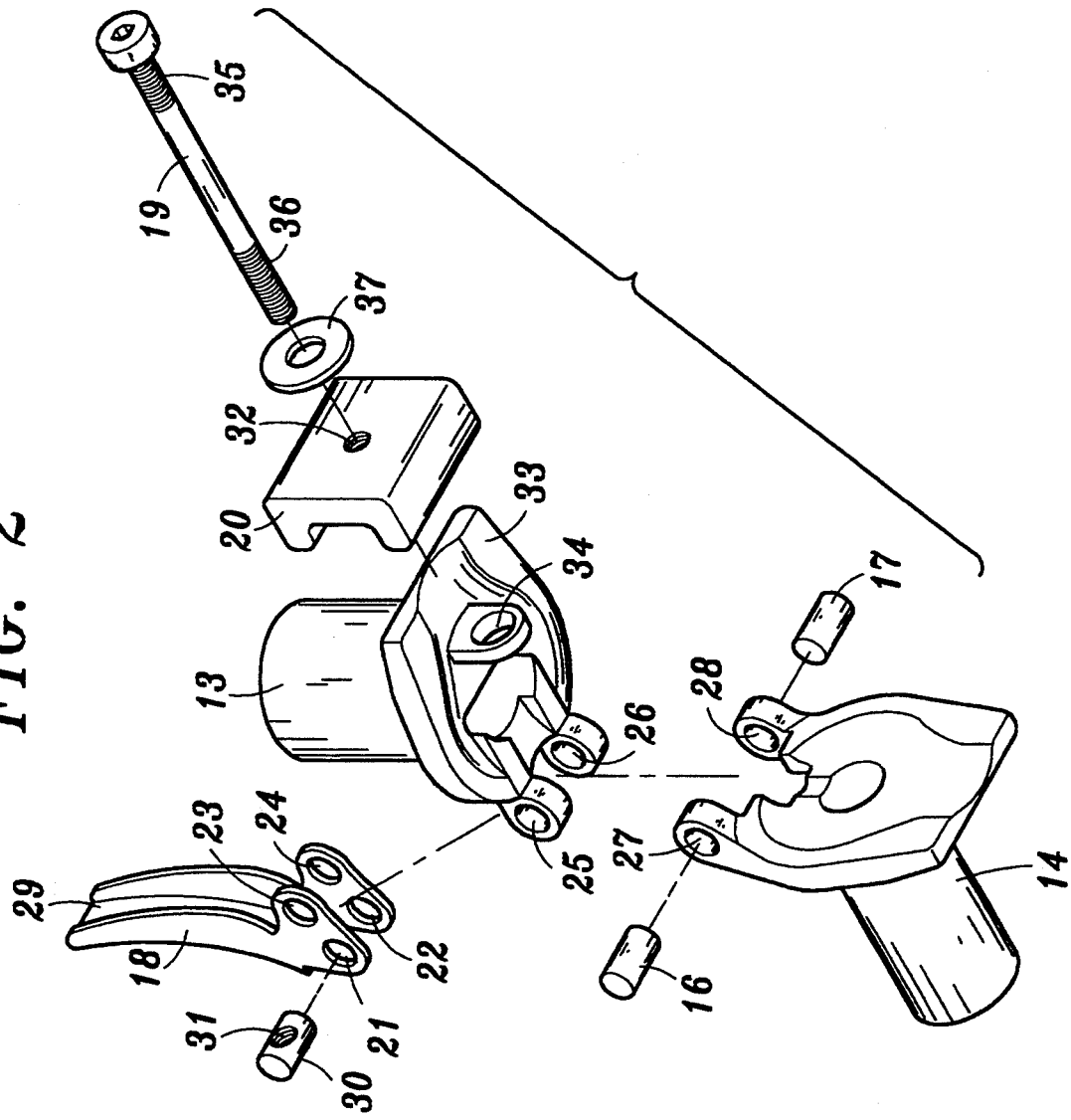
FIG. 2 is a perspective exploded view of the collapsible bicycle handlebar according to the present invention.

Referring to FIG. 2, the perspective exploded view of the handlebar structure shows that the upper tube 13 and the lower tube 14 are pivotally connected by inserting pivotal pins 16 and 17 through pivotal holes 25, 26, 27 and 28. The locking mechanism 15 includes a pressing lever 18, a bolt 19 and a U-shaped clamping member 20. The pressing lever 18 has a long groove 29 which has two sets of perforations 21, 22 and 23, 24 that are opposite to one another. Two of the perforations 23 and 24 are aligned with the pivotal holes 25 and 26 to receive the pivotal pins 16 and 17 so that the upper tube 13, the lower tube 14 and the pressing lever 18 are all connected together. The other two perforations 21 and 22 of the pressing lever 18 are used to receive a pivotal bolt 30 having a hole 31 at its center. When the bolt 19 is inserted through a bolt hole 32 of the U-shaped clamping member 20, it passes through an opening 34 on the underside of a flange 33 in the upper tube 13, and the bolt 19 reaches through the hole 31 of the pivotal bolt 30. The male threads 35 at the front end of the bolt 19 are reversed threads while the male threads 36 at the rear end are normal threads. As a consequence, the reversed female threads in the bolt hole 32 of the U-shaped clamping member 20 mates perfectly with the male threads 35 of the bolt 19, and the female threads in the hole 31 of the pivotal bolt 30 mates perfectly with the male threads 36 of the bolt 19. In addition, a circular washer 37 is inserted between the bolt 19 and the U-shaped clamping member 20.

Referring to FIG. 3 and FIG. 4, which respectively show the cross sections of the handlebar assembly in a mounting and dismounting position. In order to mount the handlebar assembly, the upper tube 13 is first aligned with the lower tube 14, so that the flange 33 of the upper tube 13 and the flange 38 of the lower tube 14 are snug together. As a consequence, a force can be applied to the pressing lever 18, which functions as a lever with the pivotal joint at the upper tube 13 and the lower tube 14 as a pivotal point, the coupling point of the bolt 19 with the pressing lever 18 acts as the fulcrum of the lever. Pushing the pressing lever 18 upward towards the upper tube 13 causes the bolt 19 to drive the U-shaped clamping member 20 inward. This clamps the flanges 33 and 38 tightly and enables the upper tube 13 and the lower tube 14 to be locked and secured in an upright position. In order to dismount the handlebar assembly in the collapsible bike, the flange 33 of the upper tube 13 has to be separated from the flange 38 of the lower tube 14. Pushing the pressing lever 18 downward causes the U-shaped clamping member 20 and the flanges of the upper tube and the lower tube to be disengaged from one another. The tightness of the U-shaped clamping member 20 can be adjusted by turning a bolthead 39 of the bolt 19. Because the male threads 35 at the front end of the bolt 19 are reversed threads while the male threads 36 at the rear end are normal threads, turning the bolt 19 clockwise causes it to press the U-shaped clamping member 20 inward. On the other hand, turning the bolt 19 counter clockwise causes it and the U-shaped clamping member 20 to be loosen up. Since the male threads 35 at the front end of the bolt 19 is locked onto the U-shaped clamping member 20, the latter can therefore be securely mounted and the difficulty in clamping is eliminated.

Figure 5:
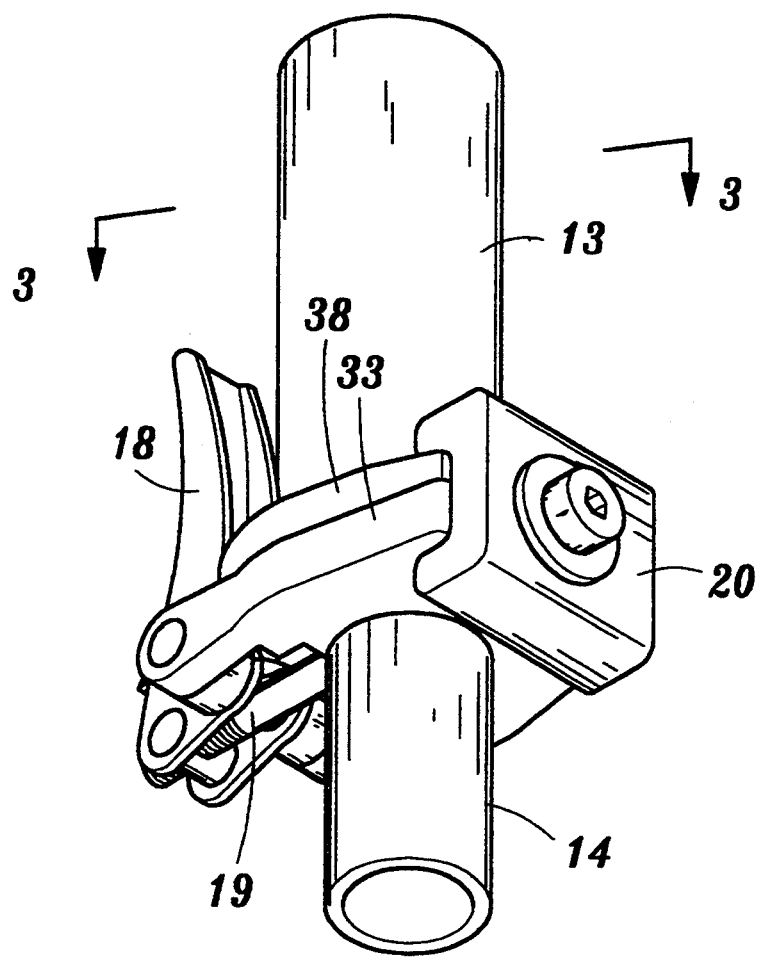
FIG. 5 is a perspective view of the collapsible handlebar showing the upper tube mounted vertically with the lower tube according to the present invention.

Referring to FIG. 5 which shows a perspective view of the collapsible handlebar in a mounting position. The upper tube 13 and the lower tube 14 are mounted vertically and secured by the locking mechanism. The pressing lever 18 is used to engage the tight clamping of the flanges 33 and 38 of the upper tube 13 and the lower tube 14 by the U-shaped clamping member 20. As a consequence, the collapsible handlebar is securely mounted and stays in a locked position.

A detailed embodiment of the invention is illustrated in the drawings and previously described in detail. It will be appreciated by those skilled in the art that modifications of such embodiment may be made. It is therefore desired that the invention not be limited to the described embodiment, and it is intended to cover in the appended claims all such modifications as falling within the true spirit and scope of the invention.

What is claimed is:

1. A locking mechanism for the handlebar structure of a collapsible bicycle of the type including an upper tube having a flange at its lower end and a lower tube having a flange at its upper end, the mechanism comprising:

a) a pressing lever;
   b) means connecting the pressing lever to the flanges of the upper and lower tubes for permitting the tubes to pivot relative to each other and the pressing lever to pivot relative to the flanges about a common pivot axis;
   c) a U-shaped member for detachably clamping the flanges together and provided with a bolt hole therethrough;
   d) a first bolt having front and rear ends, the first bolt extending through the bolt hole of the U-shaped member, the front end being coupled to the U-shaped member and the rear end being coupled to the pressing lever, with the common pivot axis defining a pivot point and the coupling point of the front end with the pressing lever defining a fulcrum; and
   e) whereby when the upper and lower tubes are mounted in an upright position with the flanges together, the pressing lever may be pivoted upwardly towards the upper tube and cause the first bolt to draw the U-shaped member into clamping engagement with the flanges and maintain the tubes in the upright position, and release of the U-shaped member may be realized by pivoting the pressing lever downwardly towards the lower tube.

2. The locking mechanism of claim 1 wherein:

a) the front end and rear end of the first bolt are respectively provided with opposite male threads;
   b) a second bolt carried by the pressing lever and including a passageway therethrough for receiving the rear end of the first bolt; and
   c) the bolt hole of the U-shaped member and passageway of the second bolt being provided with opposite female threads corresponding to the opposite male threads of the first bolt for varying the clamping force of the U-shaped member.

* * * * *